(12) United States Patent
Lochridge

(10) Patent No.: US 6,305,766 B1
(45) Date of Patent: Oct. 23, 2001

(54) WORKSTATION WITH OPENING AND SUPPORT FOR PERSONAL COMPUTER

(76) Inventor: Edwin P. Lochridge, 452 Ridgewood Rd., Atlanta, GA (US) 30307

( * ) Notice: Subject to any disclaimer, the term of this patent is extended or adjusted under 35 U.S.C. 154(b) by 0 days.

(21) Appl. No.: 08/814,270

(22) Filed: Mar. 10, 1997

Related U.S. Application Data

(63) Continuation-in-part of application No. 08/445,251, filed on May 19, 1995, now Pat. No. 5,610,798.

(51) Int. Cl.[7] ............................... H05K 5/03; G06F 1/16
(52) U.S. Cl. ........................................ 312/223.3; 361/683
(58) Field of Search ................................... 361/681–683, 361/680, 724–727; 312/223.1, 223.2, 223.3

(56) References Cited

U.S. PATENT DOCUMENTS

| | | | |
|---|---|---|---|
| 4,669,789 | * | 6/1987 | Pemberton ............................ 312/7.2 |
| 4,695,104 | * | 9/1987 | Lederman ............................. 312/28 |
| 5,611,608 | * | 3/1997 | Clausen ............................. 312/223.3 |
| 5,931,549 | * | 8/1999 | Lindberg ............................ 312/223.3 |
| 6,086,173 | * | 7/2000 | Restell ............................. 312/223.3 |
| 6,155,180 | * | 12/2000 | Clark ................................. 108/50.2 |

* cited by examiner

Primary Examiner—Lynn D. Feild
(74) Attorney, Agent, or Firm—Merchant & Gould P.C.

(57) ABSTRACT

A personal computer having a housing which is adapted for cooperation with ergonomically correct furniture. The housing has a parallelepiped configuration, with the two major faces forming the front and back of the parallelepiped. The disk drive and/or CDRom player and controls for the personal computer are disposed on the front of the major face adjacent to top of the housing. Input/output ports for connection with the monitor, keyboard, etc., are disposed on the side of the housing. A work station in which a personal computer can be used is provided with a support structure for supporting the computer in an opening at a level in which part of the computer is disposed above the level of the work surface and part is disposed below the level of the work surface.

11 Claims, 10 Drawing Sheets

WORKSTATION WITH OPENING AND SUPPORT FOR PERSONAL COMPUTER

This application is a continuation-in-part of Ser. No. 08/445,251 filed May 19, 1995, now U.S. Pat. No. 5,610,798.

BACKGROUND OF THE INVENTION

The present invention is directed to a personal computer housing which is configured to be used in ergonomically progressive environments and to promote the efficient use of space.

Personal computers are increasingly essential tools in modern offices and homes. A typical computer system will include an information entry device for use by the operator to enter information into the system, an information display device for transmitting information to the operator from the system, input/output devices for storage and retrieval of information and processing of instructions or programs, information processing equipment for manipulation of the information input into the system, a chair to support the operator and a desk to support the equipment and, at various times, the operator.

Examples of typical information entry devices include a keyboard, a mouse, a speaker to receive information from the operator in voice form, a digitizing tablet or pad for cooperation with a mouse or puck which can be programmed to run a certain program depending on the position of the mouse or puck when different buttons are activated, and a system involving the interaction of a pen with the screen on some types of monitors. Examples of typical information display devices include a cathode ray screen, a LCD display, a printer and speakers producing sounds. Examples of typical input/output devices include permanent hardware devices such as a hard disk drive and temporary, interchangeable devices such as a floppy disk drive, tape cartridge drive or compact laser disk drive, these temporary, interchangeable devices also exemplifying input/output devices which are operator accessible during normal operation. Examples of typical information processing equipment include a central processing unit or chip, a motherboard which houses the central processing unit, additional processing hardware and slots for installation of additional hardware boards designed to operate with the system, a power supply with exposed power switch, and exposed plugs for connection of wires to interface with the other equipment such as the keyboard, monitor, printer, etc., i.e., input/output ports.

A multitude of chair configurations have been considered for supporting the computer operator in various postures. While conventional thinking recommended an upright posture for the operator, studies have shown that in fact a more reclined posture relieves unnecessary stress on the body, and can provide a healthier and more productive environment.

Similarly, the desks used with computer systems were originally designed with a single, flat, and typically rectangular work surface. More modern designs are intended to overcome problems which result from the introduction of computer systems into this traditional environment. Such modern designs often include more than one support surface, for example, one to hold the monitor at an appropriate level for the operator and a readily-accessible work surface for holding a keyboard. The work surface can be tiltable and/or have an adjustable height.

In early personal computers, all of the system equipment often was housed in a single box for placement on a traditional desktop in front of the operator. As personal computers evolved, it became apparent that it would be advantageous to separate the keyboard and monitor from the box housing the central processing unit, motherboard, disk drives and power supply. This increased the flexibility of the personal computers by permitting the use of different monitors and keyboards. An additional advantage from this change was improved ease of use for the operator, since the keyboard and monitor could be placed in a position in accordance with his or her personal preferences and needs without the need to accommodate the box housing the processing equipment. This improved the health and productivity of computer operators and increased the value of the personal computer as an office tool.

Computer housings typically include a frame which is provided with holes for attachment of standard sized components, including input/output devices (e.g., disk drives, CDRom drives, etc.), motherboards with add-on board and memory slots and CPU chips, and power supplies. A removable shell is attached to the frame, which protects the components while allowing access to plugs, controls and input/output devices, and which may provide necessary shielding from electromagnetic forces.

Personal computer housings are generally designed in a parallelepiped shape, with the major faces of the parallelepiped being oriented as the top and the bottom of the housing. This design harkens to the original personal computer configurations, under an apparent assumption that many operators will desire to place the monitor on top of the housing. Thus, the slots for inserting disks into the interior of the disk drives, etc., are located on a front edge face of the parallelepiped so that the operator can insert the disks into the system. The plugs for connection of input/output devices are usually disposed at the rear edge face. The power switch for the computer often is also located at the rear of the parallelepiped with the plugs, due to the fact that the power supply is usually placed at the rear with a fan for removal of heat from the system. Sometimes, the power switch is located at the front of the box to improve the accessibility of the switch for the operator. This design is problematic in that studies have shown that health and productivity factors suggests that the level of the monitor should be lowered, contradicting the underlying premise of this housing design. In addition, this housing design is not well-suited for use with the more modern, ergonomically-correct office furniture coming into more common use.

Another design for the personal computer housing is the so-called "tower" configuration. In this design, the housing is placed on the floor next to the desk, beneath the desk or in an upright position on the desktop. The disk drives and power controls in this design are located at one end of the forward face of the parallelepiped in an "over and under" configuration. The plugs are again found in the rear of the system. In this design, the major faces of the parallelepiped are the sides of the housing. This design occupies a smaller amount of valuable work surface space in comparison with the design discussed previously since it can be placed on the floor. In addition, this design does not require a raised level for the monitor. However, this design is not readily accessed by the operator from a relaxed and healthy posture. In addition, this design is not well-suited for use with ergonomically-correct furniture. In addition, the personal computer can be subjected to undesirable abuse due to its resting on the floor, for example, during office cleaning operations.

Studies have suggested that the health and productivity of office workers using personal computers could be improved if the furniture is designed to promote more of a reclined position, as opposed to the upright position which has long-been advocated. However, the more reclined posture is disadvantageous to the extent that it requires a greater amount of floor space. To minimize the adverse effects from this increased requirement for floor space for the operator, it would be desirable to reduce the space requirements for the furniture and equipment, of course without sacrificing productivity.

SUMMARY OF THE INVENTION

The present invention provides a personal computer whose housing is designed to cooperate well with the new generation of ergonomically correct furniture. The housing of the present invention can be located off of the floor, for example, secured on or underneath a shelf. The housing can be located so as to not encumber the foot and leg space of the operator or impede the operator's movement, while still permitting easy access to power controls, disk drives, etc., by the operator from a suitable posture with minimal reaching or stretching. The housing permits easy access to the connecting plugs without the need for movement of the computer or furniture. The housing design of the present invention is readily used with current standard hardware components, and could be used to reconfigure equipment found in traditional housing designs. Thus, the present invention will ease the adoption of new computer work station designs and thereby improve the health and productivity of those using computers.

The present invention provides a personal computer whose housing is oriented in an upright position. The housing is parallelepiped in nature, and the major faces of the parallelepiped are the front and back. The operator-accessible input/output devices (e.g., disk drive and CDRom player) and/or controls are disposed on the front of the major face of the housing, adjacent the top of the housing. The input/output devices extend from the front major face in the direction of the back major face of the housing. Input/output ports and/or the plug for the personal computer are disposed on one of the side faces of the housing.

Since the disk drive, CDRom player and/or controls are located on one of the major faces of the housing, the housing is relatively shallow, and can easily be secured on or under a narrow shelf. This reduces the amount of space needed between the furniture and the wall, and also prevents the computer from intruding into the operator's leg and foot space. By placing the disk drive, etc., near the top of the housing, it is possible for these items to be located above the level of the operator's work surface, permitting the operator to have easy access to them, but without occupying valuable space on the work surface. The location of the input/output ports and/or plug of the side face of the housing improves the access to those items without the need for moving the computer housing or moving the furniture on which it is located, and again reduces the amount of space needed between the furniture and the wall.

In a further embodiment, the present invention provides a system for permitting the computer housing to be supported in an opening in or adjacent to a work surface, and to be pivoted out of the opening to permit access to connecting wires and the like. In one aspect of this feature of the present invention, the pivot point can be located on an edge of the computer housing, near the upper surface. In a further aspect of this feature of the present invention, the pivot point can be disposed at or near the center of the major faces of the computer housing. In this case, when the housing is pivoted, less vertical clearance space is required. The two aspects can be combined if the bearing support for the pivot point near the center of the major faces is configured to permit the pivot point to move away from the bearing surface. In addition, in the further aspect, it is advantageous if a double pivoting system is used.

In a still further aspect of the present invention, the personal computer housing is modified to permit easier access to components such as disc drives and the like.

DETAILED DESCRIPTION

Figure 1:
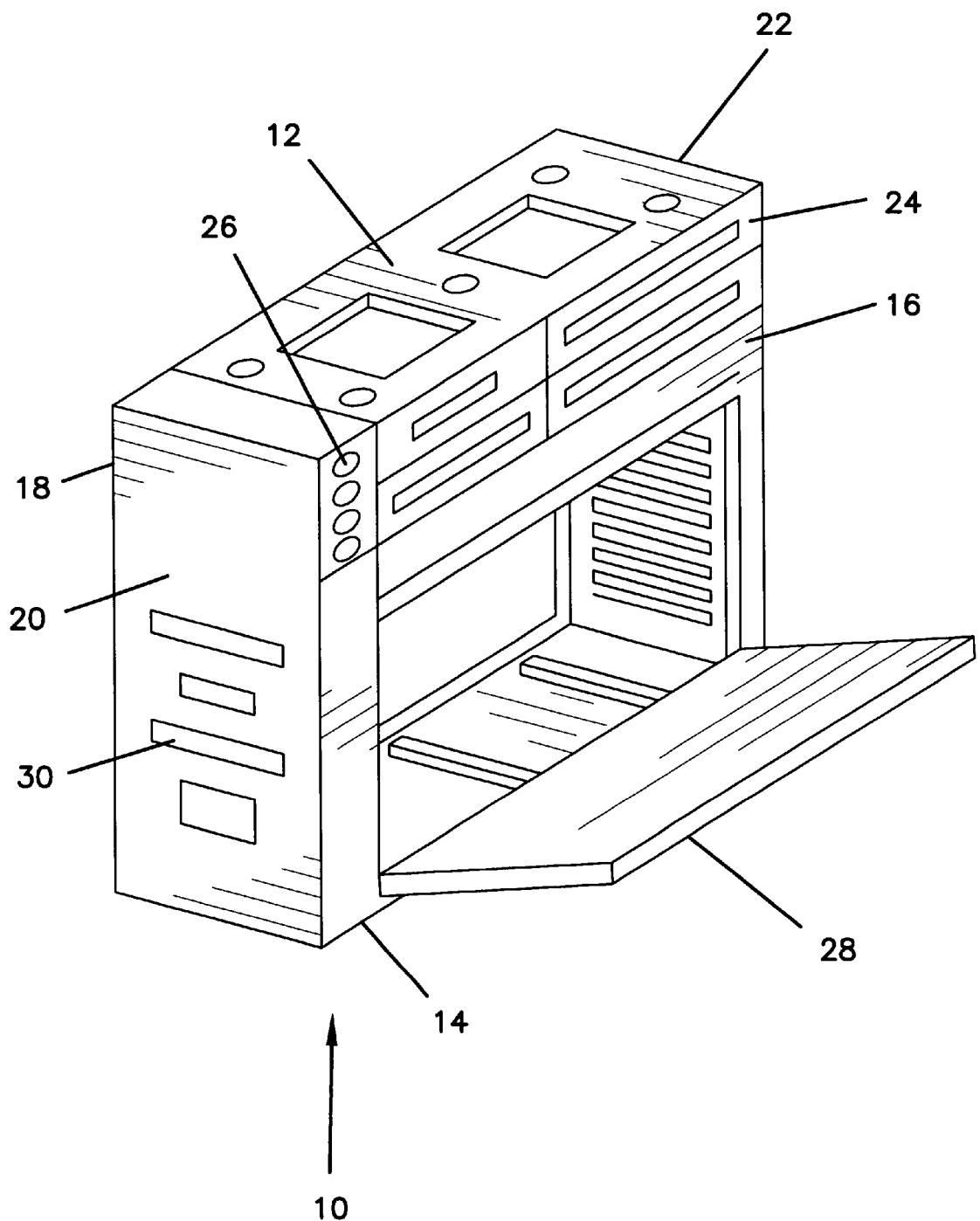
FIG. 1 is a perspective view of the personal computer housing according to the present invention.
Figure 2:
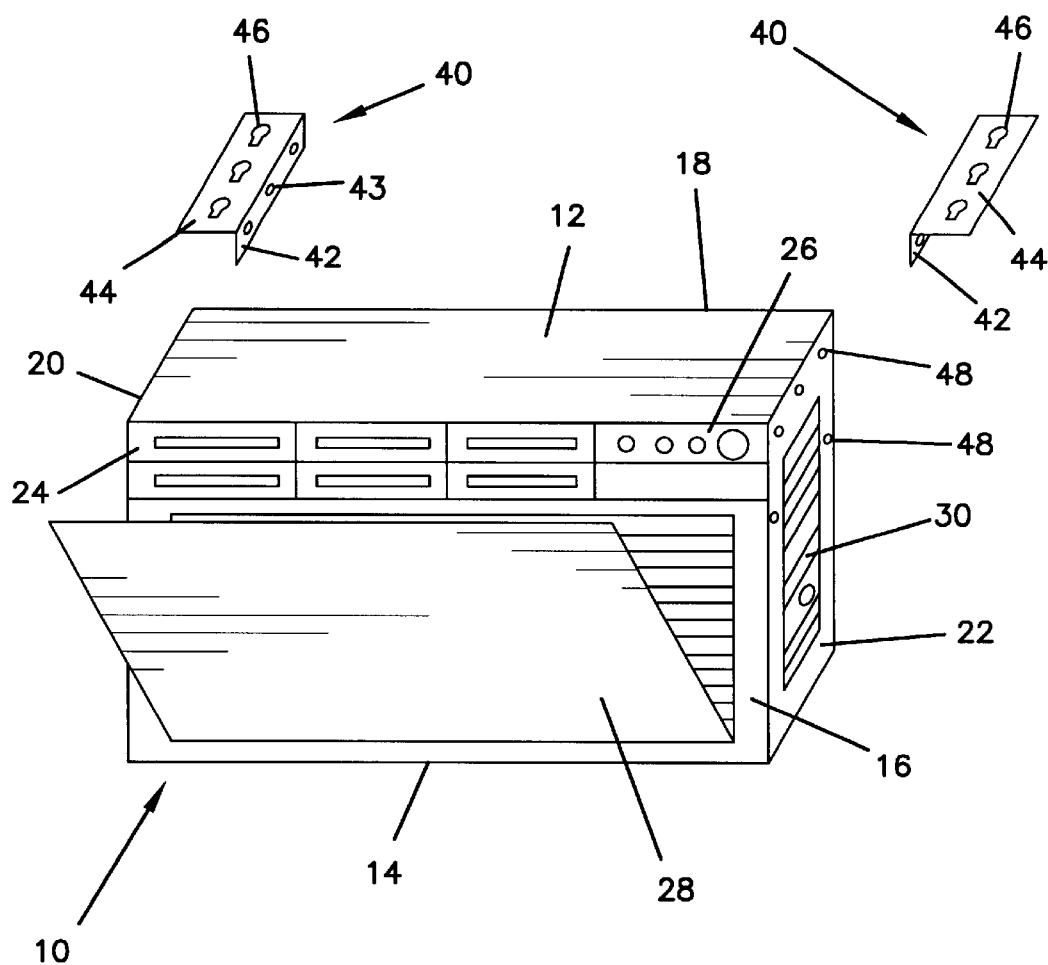
FIG. 2 is a perspective view showing details of a system to permit the securing of the personal computer of the present invention to a shelf.

Referring to FIGS. 1 and 2, the personal computer housing 10 of the present invention is in the shape of a parallelepiped. The housing 10 has opposed top and bottom faces 12 and 14 respectively. Major faces 16 and 18 form the front and back of the housing, respectively. Faces 20 and 22 form the sides of the housing. While the two housings depicted are not identical, they share similar features, and thus the same reference numerals are used to identify corresponding features in each figure.

It is preferred that the two opposed major faces 16 and 18 be separated by a distance of no more than about 8.5 inches.

That is, the "width" of the side faces 20 and 22 is no more than about 8.5 inches (about 21 cm). This is the current depth of a standard disk drive component. As the size of standard disk drive components is changed, this dimension can be changed. In fact, it is contemplated that the dimensions of the present housing will be modified as the standards for various components are changed. However, it is contemplated that the changes will follow the changes in standards, not only in overall dimensions, but also, e.g., locations for holes for attachments of drives, motherboards, etc.

It is preferred that the top 12 and bottom 14 be separated by a distance of at least 15 inches (about 37 cm). That is, the "height" of the major faces 16 and 18 forming the front and back is at least 15 inches. It is also preferred that the two opposed side faces 20 and 22 be separated by a distance of at least 15 inches (about 37 cm). That is the "width" of the major faces 16 and 18 is at least 15 inches. These dimensions provide an interior volume similar to that of current personal computer housings, and again, this permits the ready use of standard components with the housing of the present invention.

The operator-accessible input/output devices (e.g., disk drives, CDRom players, etc.) 24 for the personal computer are located on the major face 16 forming the front of the personal computer housing. These are located adjacent the top of the housing, and more than one row can be provided if necessary to accommodate the disk drive and/or CDRom players. The disk drive and/or CDRom player extends in a direction from front face 16 toward face 18. Similarly, the controls 26 for the personal computer can be located on front face 16, adjacent the top. The controls can include, for example, the power switch for the personal computer.

The housing can be provided with a hinged door 28 to permit access to the interior of the personal computer, to allow replacement/repair of the motherboard, installation/removal of add-on boards, etc. This may be advantageously located on the front face 16.

The input/output ports for connecting the personal computer with a monitor, keyboard, etc., are disposed on one of the side faces. The plug for connecting the personal computer to a power source can also be positioned on the side face. This allows easy access to these items without the necessity of moving the housing. This convenient access also permits the better management and/or concealment of the wires. It should be recognized that all of the input/outputs need not be located on the same side face. For some applications, it might be more convenient to have some ports on one side face and others on the other side face.

FIG. 2 illustrates an adaptation permitting the housing to be secured to a shelf or desk. Angle bars 40 have a vertical leg 42 and horizontal leg 44. The side face of the housing has holes which permit the vertical leg 42 of the angle bar 40 to be secured to the housing, for example with screws. The horizontal leg 44 permits the computer to be mounted on a shelf, etc. The horizontal leg 44 can be provided with openings such as the illustrated key hole openings 46, which permit the computer to be secured to a shelf, etc. For example, to mount the computer on the underside of a shelf, the angle bars will be attached at the tops of the side faces of the computer housing, for example with screws through aperture 43 in leg 42 into apertures 48 in the housing. The computer can then be mounted on the underside of a shelf by means of screws which pass through and engage keyhole openings 46. The keyhole shape is particularly useful, since it permits the computer to be readily removed and then remounted without the need to remove the screws from the underside of the shelf.

Figure 3:
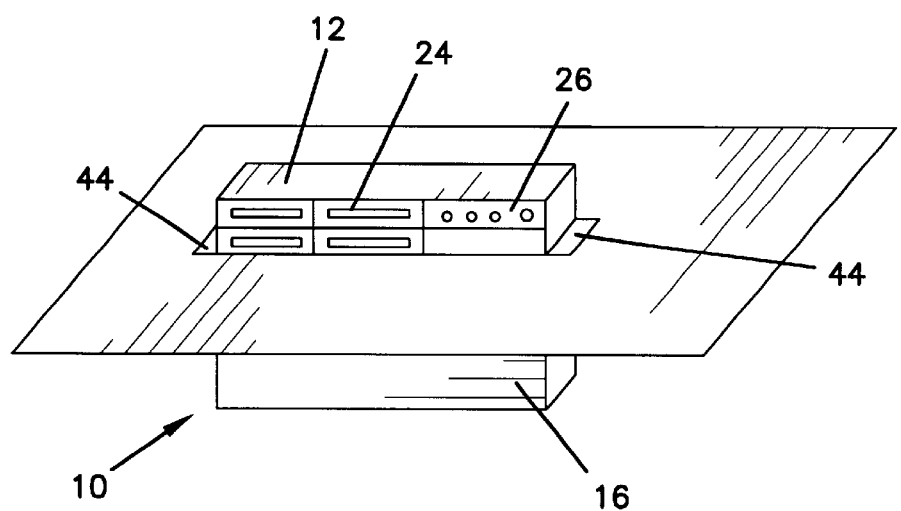
FIG. 3 is a perspective view showing a personal computer of the present invention installed in an opening in a shelf.

The computer can also extend through a shelf or desktop, as seen in FIG. 3. In this case, the angle bars 40 are attached to the side faces at a location intermediate the top and bottom, preferably at about the lowermost level of the input/output devices 24 (e.g., the location of the lower set of apertures 48 in FIG. 2). The computer can then be dropped through an opening in a shelf or desktop, etc., to rest on the horizontal legs 44. Attaching the horizontal legs to the shelf or desktop by means of screws through apertures 46 can be carried out if necessary. It can be seen that the operator-accessible input/output devices and regularly-accessed controls will be conveniently located above the upper surface of the shelf or desktop, while the rest of the computer will be "out of the way", below the shelf or desktop.

Figure 4:
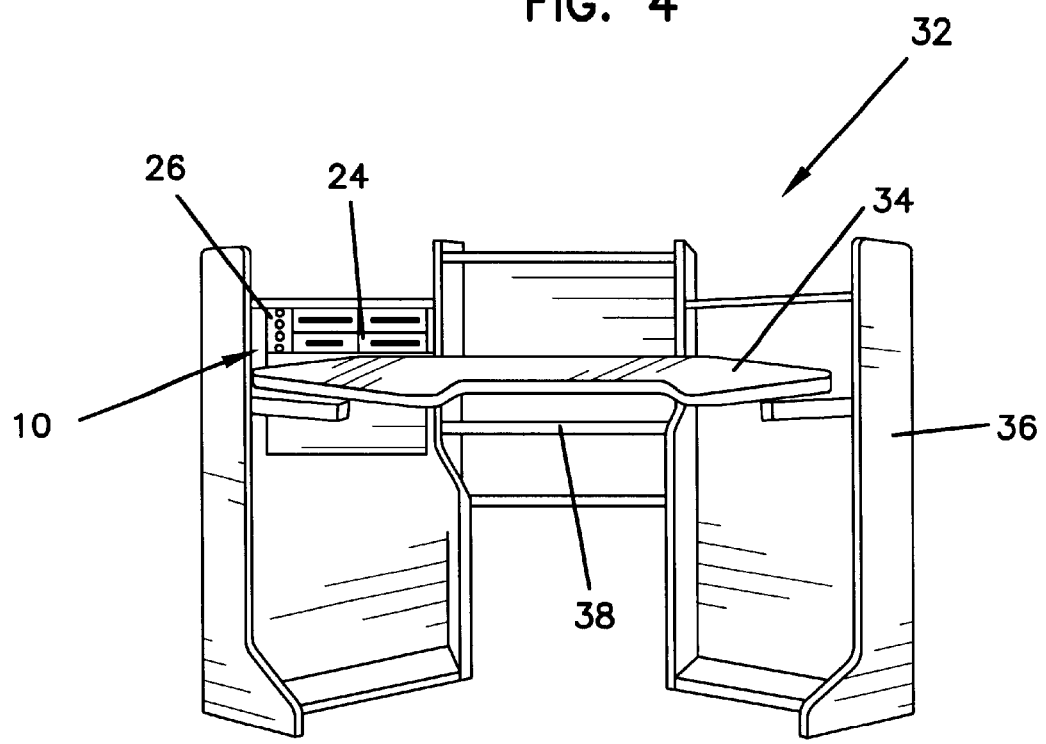
FIG. 4 is a front view of computer work station in which a personal computer of the present invention has been installed.

FIG. 4 illustrates the use of the personal computer of the present invention in connection with an ergonomically-designed work station. The present invention is particularly useful with a workstation known as the POWER STATION®, available from Metamorphosis Design & Development, Inc. of Atlanta, Ga. The workstation 32 includes a tiltable work surface 34 and a stand 36 which carries the work surface. The stand is located opposite the position which would be occupied by the operator and generally surrounds the work surface. The stand could be provided with a number of shelves for holding books, a lamp, a telephone, etc. The monitor for the personal computer will generally be located in middle section 38 on a shelf. The keyboard will be located on the work surface 34.

The personal computer 10 of the present invention can be secured on or underneath a shelf on stand 36, or can extend through a shelf or desktop in a manner similar to that shown in FIG. 3, as discussed above. The arrangement of the disk drives, etc., at the top of the front face of the housing allows the disk drives, etc., to be disposed at a level which is above the level of the work surface 34. The orientation of the housing with the major faces being the front and back provides a shallow configuration which permits the personal computer to be located on a relatively narrow shelf, without intruding into the foot and leg space of the operator and without extending significantly beyond the perimeter of the stand 36. This in turn permits the stand to be placed closer to a wall, thereby reducing the consumption of valuable floor space. This is also facilitated by the location of the input/output ports and plug on the side of the housing. This permits easy access to these items without having to move the housing or to move the furniture to gain access to the rear face of the housing, where such features generally have been mounted. It also should be noted that the stand 36 could be designed with channels or housings for wires which would keep the wires out of the way of the operator. In this regard, it is preferable to locate the input/output ports and plugs so that in use they will be disposed below the level of the work surface 34.

It should be noted that it might be possible to separate the disk drives and power controls in a separate housing from the rest of the personal computer, which would permit the two to be placed in different locations. However, this would require the use of relatively expensive shielded connecting wires to comply with FCC and UL regulations.

FIGS. 5–16 illustrate a further aspect of the present invention. This aspect of the present invention permits the computer housing to cooperate with a work surface so as to be maintained in use at a position partially below the work surface. This aspect of the invention further permits the computer housing to be moved easily to facilitate access to wire and cable ports, etc. that would otherwise be disposed relatively inconveniently below the level of he work surface. It will be appreciated that this aspect of the present invention, while useful for the housing illustrated in FIGS. 1–4, is not limited thereto in its application. For example, this aspect of the present invention is readily applicable to personal computers having a standard tower configuration.

Referring to FIGS. 5–8, this aspect of the present invention includes a support structure 40 for cooperating with an aperture in a work surface, e.g. a desk or table top. Alternatively, the support structure could be adapted to be appended to the side of a work surface, particularly for retrofit operations. It should also be recognized that the features of the support structure could be built into or otherwise made integral with new work surfaces.

Figure 6:
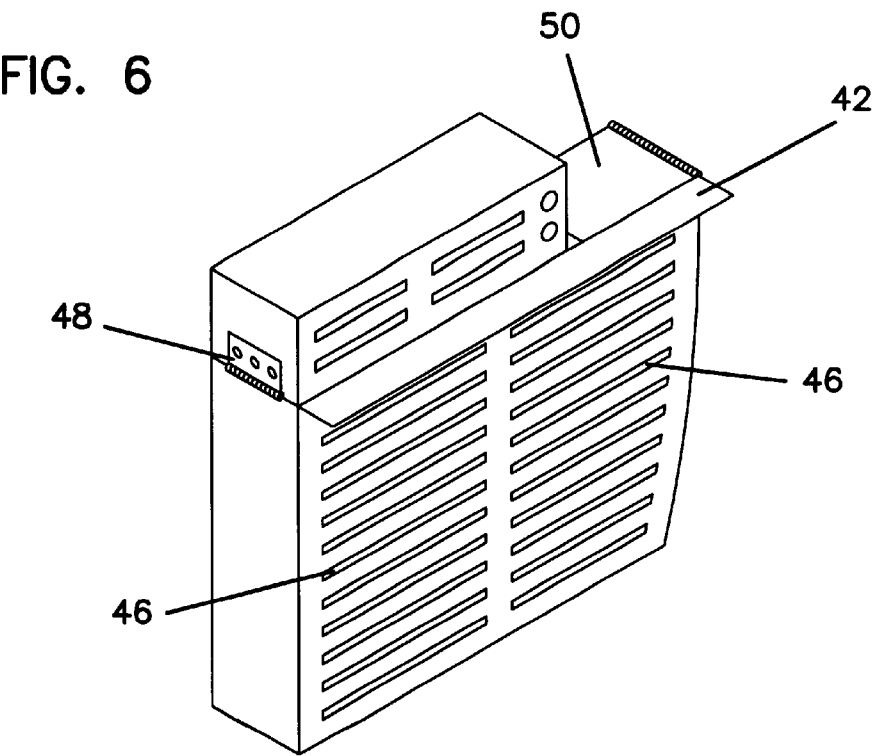
FIGS. 6–8 are perspective views of the further embodiment in accordance with the present invention in which the personal computer is adapted to improve access to wire connections.

The support surface 40 preferably includes a collar 42 for resting on the work surface. The collar can extend partially or completely around the perimeter of the support structure. The computer housing is disposed in this support structure. Generally, the support structure maintains the personal computer housing in a position where the controls, etc. are above the level of the work surface and accessible to the user, as seen in FIG. 6. To this end, the support structure can include a horizontal shelf or bracket for supporting the personal computer housing if needed.

The dimensions of the support structure are sufficiently large to accept the computer housing, and to permit the computer housing to pivot out of and/or within the support structure. In this regard, it is desirable to provide one wall of the support structure with a curved configuration that tracks the pivoting movement of the computer housing as shown in the drawings. This is advantageous in that it reduces the amount of leg room beneath the work surface that is occupied by the support structure. However, it would be possible to use a structure having a regular parallelepipedic form as long as the dimensions are sufficiently large to permit the pivoting.

It also is desirable to provide a slot 44 in one of the walls of the support structure. This permits the wires to pass from the computer housing to the monitor, keyboard, etc. easily. In some cases, it might be possible to have the side of the support structure completely open, thereby eliminating that sidewall as a potential impediment to the pivoting motion of the computer housing while permitting the passage of wires.

The walls of the support structure can be provided with ventilation openings 46 if desired. The bottom of the support structure can be either open or closed as desired. In addition, the support structure can be modified to permit the operator to direct the warm air from the personal computer in a desired direction, for example toward the operator's feet to provide increased comfort. Thus, it is contemplated that the support structure could be provided with louvered ventilation openings, small fans, etc. if desired.

In order to permit the pivoting action of the computer housing, a pivot is provided at one edge of the support structure. This pivot cooperates with a second pivot 48 attached to the computer housing. For example, the two pivot members may combine to form a hinge system. It is preferred that the pivot members be readily released from each other, to facilitate removal of the computer housing from the work surface if desired. For example, this could be accomplished by having the two pivots as hinge plates that can be joined for pivoting action by a readily removed hinge pin. The computer housing can be provided with handles on the sides near the top in order to facilitate the pivoting movement or the lifting.

Figure 7:
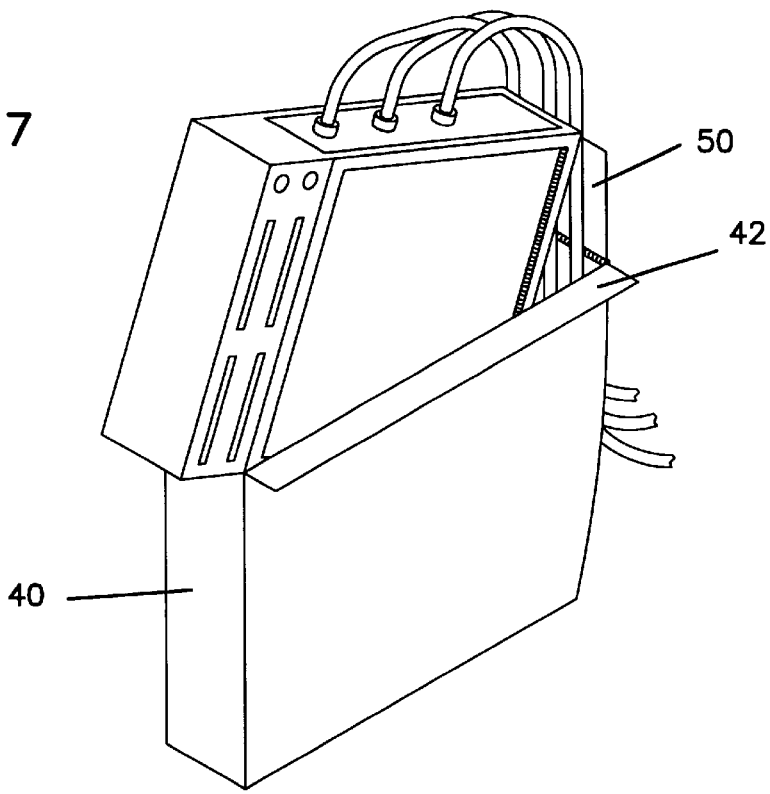
Figure 8:
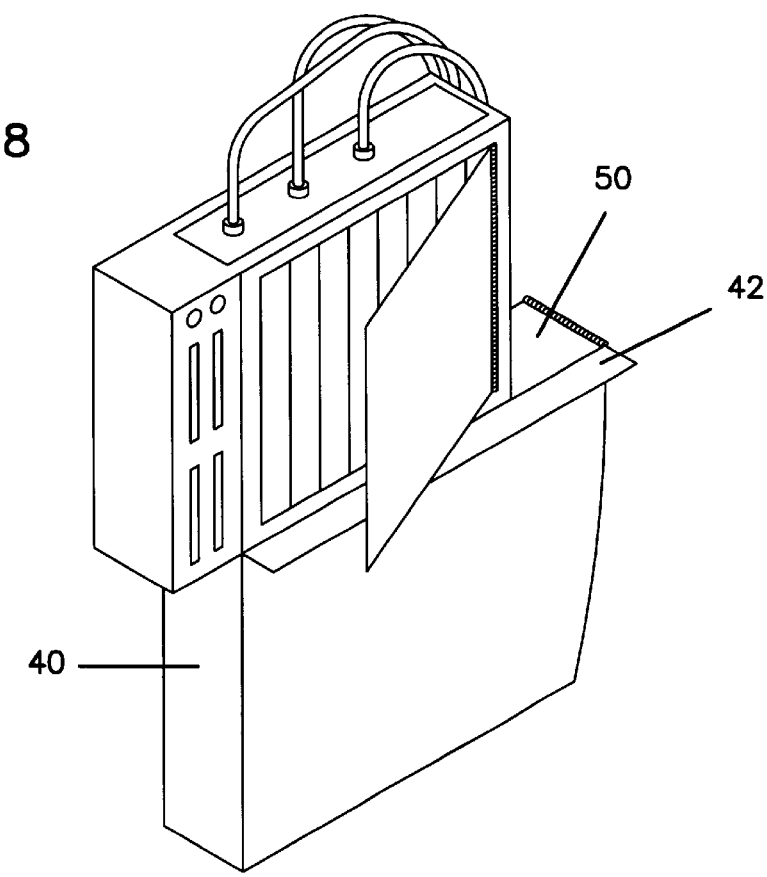

The edge of the support structure opposite the pivot can be provided with a flap door 50. When open, the flap door permits the pivoting movement of the computer housing into and out of the support structure as shown in FIG. 7. This would be done when relatively brief access to the computer housing, e.g. to adjust a wire or cable connection, is needed. The flap door is dimensioned so as to lie essentially flat on the work surface or collar 42 when closed, and to cover the upper opening of the support structure sufficiently that the computer can rest on the flap door, as shown in FIG. 8. This is useful when more extended access to the computer housing is needed, e.g. for adding or replacing boards for the computer. Other systems could be implemented to maintain the computer housing in the position above the work surface if desired.

Figure 9:
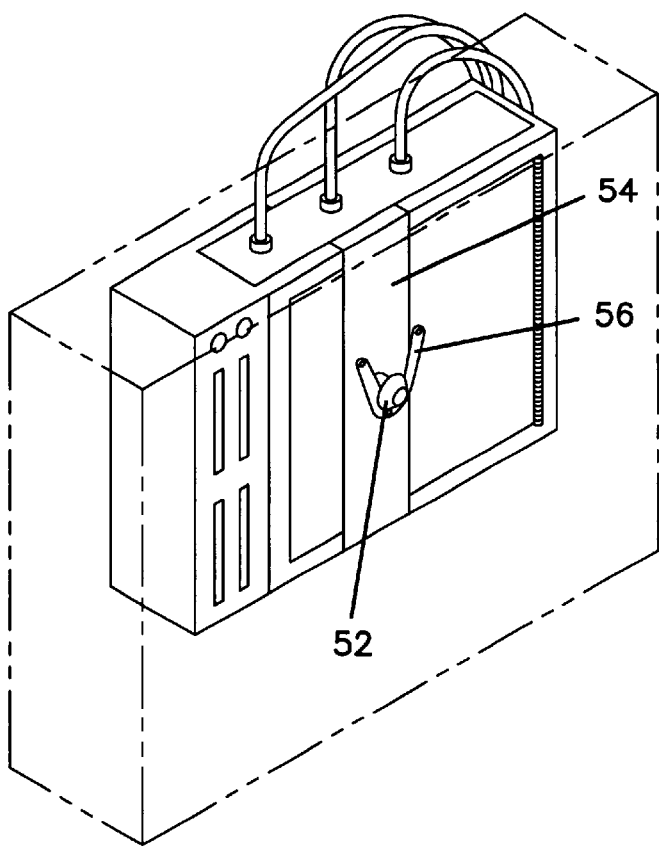
FIG. 9 is a perspective view of a further modification to the embodiment in accordance with the present invention in which the personal computer is adapted to improve access to wire connections.

A further modification of the embodiment of FIGS. 5–8 is seen in FIG. 9. In this embodiment, the personal computer housing includes a pivot pin 52 disposed substantially at the center of the major face of the housing. If needed, a corresponding pin is provided on the opposite face. The pin can either be mounted or formed directly on the personal computer housing, especially in the case of new units, or it can be added to the housing in a retrofit manner, for example by means of bracket 54 that is removably mounted on the housing.

Pivot pin 52 cooperates with a bearing 56 that is carried on an inside face of the support structure 40. The bearing 56 preferably is provided with an upwardly open and diverging structure for reasons explained below. The support structure 40 in this case is dimensioned to permit the pivoting movement of the personal computer housing around pin 52, and FIG. 9 illustrates the case where the personal computer has been pivoted from an orientation similar to that illustrated in FIG. 6. The pivot pin can be provided with an enlarged end as illustrated, which could provide for an engagement with the bearing enjoying increased lateral stability. This may not be necessary, and other configurations for the pin, such as a simple tapered configuration may be useful.

By locating the pivot point at or near the center point of one of the faces, the pivoting action to gain routine access to the wires, etc. requires much less vertical space. Thus, it would be possible to provide shelving at a lower level above the location of the personal computer housing, without the need to remove the shelving when routine access to the wires, etc. is desired. Of course, it would be recognized that the shelving might have to be moved in order to remove the personal computer or gain fuller access to the panels opening to the interior of the personal computer housing. In such a case, it is recognized that a locking shelf system might provide additional security against unauthorized removal of the computer from the work station.

When the bearing 56 has an upwardly opening and diverging structure, the pivoting action illustrated in FIGS. 6–8 can be made an option as well. That is, this bearing structure will permit the pivot pin 52 to be moved into and out of engagement with the bearing, thereby permitting the personal computer housing to pivot in the manner illustrated in FIGS. 6–8 as well as that shown in FIG. 9. In this case, it should be recognized that additional measures may be necessary to provide for such pivoting. For example, a second flap door 50 can be provided on the support structure, at the end opposite to the end where the flap door 50 is shown in FIGS. 5–8, having a pivot member at itg free end that is capable of cooperating with a second pivot 48 of the computer housing. Thus, when the second flap door is open, the dimensions of the support structure 40 are sufficient to permit the pivoting of the personal computer about pivot pin 52. When it is closed, a pivoting position can be established similar to that illustrated in FIGS. 6–8 to permit the personal computer housing to be removed for fuller access, as shown in FIG. 8.

Figure 10:
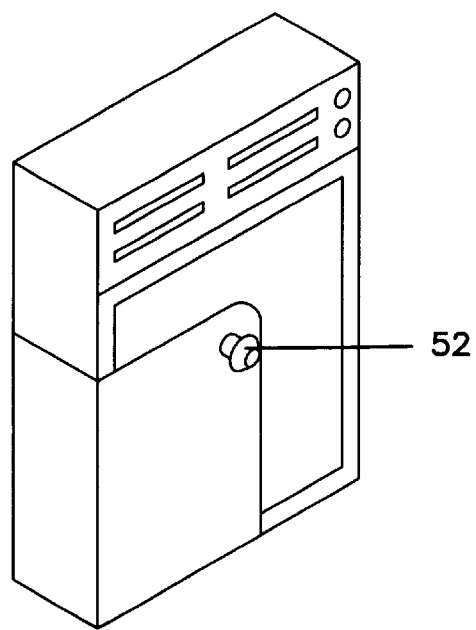
FIGS. 10 and 11 are perspective views of further modified embodiments of the personal computer housing that can be used in the embodiment of FIG. 9.
Figure 11:
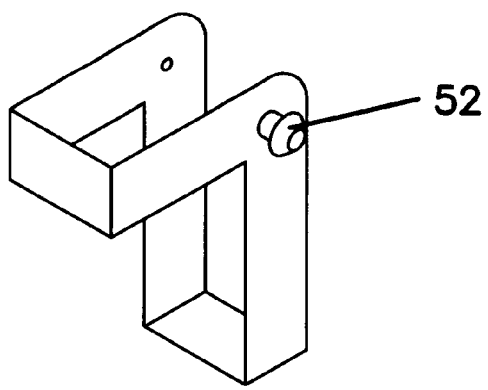

FIGS. 10 and 11 show further alternatives for providing the pivot pin 52 on the personal computer housing. In each case, the pivot pin 52 is mounted on a support member that can be fixed in the vicinity of a corner of the computer housing. These embodiments are capable of fitting a wide variety of housing sizes, thereby facilitating retrofit applications. The embodiment of FIG. 11 is desirable in terms of improving air flow to the computer housing.

Figure 5:
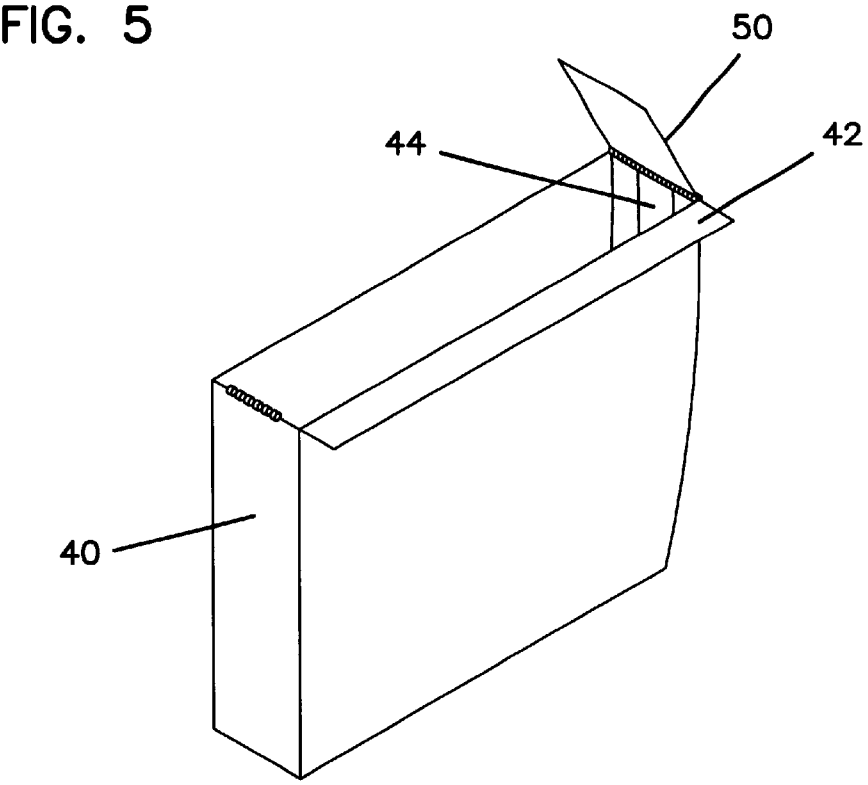
FIG. 5 is a perspective view of a housing structure used in an embodiment providing improved access to wire connections.
Figure 12:
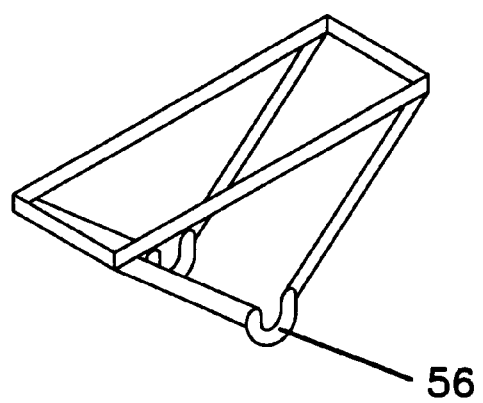
FIG. 12 is a perspective view of a further modification of the housing structure that can be used in the embodiment of FIG. 9.

FIG. 12 illustrates an alternative construction for the support structure 40. In this embodiment, the box-like structure of FIG. 5 is replaced with a framework that supports the bearings 56. The framework can be provided with a collar, flap door(s), etc. as desired.

Figure 13:
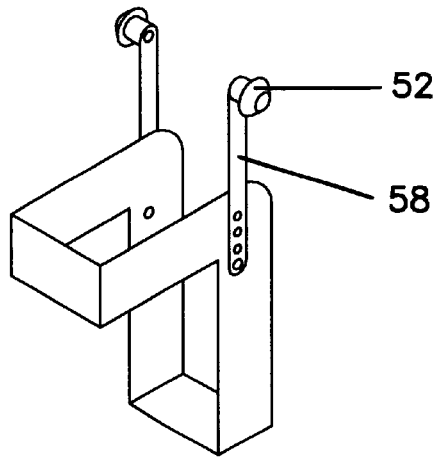
FIG. 13 is a perspective view illustrating a further embodiment for supporting the personal computer housing with a system including a double pivot.
Figure 14:
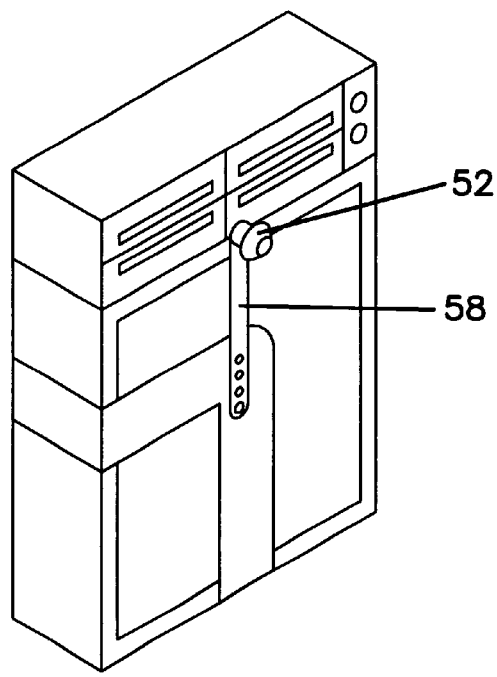
FIG. 14 is a perspective view illustrating the embodiment of FIG. 13 attached to a personal computer housing.

A further modification of the concepts illustrated in FIGS. 9–12 is seen in FIGS. 13–16. In this modification, the pivot pin 52 is itself is mounted on a pivoting structure. For example, in FIGS. 13 and 14 the pivot pin 52 is mounted on arm 58 that is pivotably mounted on a support member similar to that seen in FIG. 11, e.g. by means of a screw that passes through an aperture in the arm 58 and into the support structure. The arm 58 and/or the support structure can have a plurality of apertures to provide adjustability. While the support member in FIG. 13 is similar to that of FIG. 11, it should be apparent that other constructions for the support member would be useful as well. In addition, the arm 58 could be replaced with other structures that provide the desired double pivot action. For example, a cam wheel arrangement could be used.

This modification of the present invention is advantageous in that the support system can be used with a variety of dimensions of computer housings, and still locate the pivot pin 52 at the approximate center of the face or other location as desired. Also, the double pivot feature permits more freedom in the pivoting movement of the housing. That is, for example, the housing can be rotated in a counterclockwise direction about pivot pin 52, and at the same time can be moved to the right about the pivot point of arm 58. This would permit the upper left corner of the housing to move straight down, which would eliminate the need to provide clearance for such pivoting movement. Thus, it also would be possible to eliminate the need for the second flap door discussed above with respect to FIG. 9. Of course, in such a case it would be necessary to ensure that sufficient room was provided at the opposite side to accommodate such movement. However, this would not be a problem, particularly where the support structure was open on that side and the personal computer housing was being supported in an open area, e.g. under a desk or table.

Figure 15:
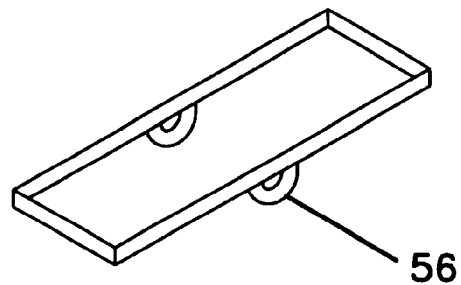
FIG. 15 is a perspective view showing a further modification of the housing structure that can be used in the embodiment of FIG. 13.

By selecting a suitable length for the arms 58, it also is possible to simplify the support structure illustrated in FIG. 12 further. This is illustrated in FIG. 15, in which it can be seen that the support structure can assume an essentially rectangular configuration with bearing surfaces being provided on two opposed sides for cooperating with the pivot points 52. As with the embodiment shown in FIG. 12, the support structure can be provided with the flap door(s), pivot members, etc. described in conjunction with the support structure 40 in FIGS. 5–8.

Figure 16:
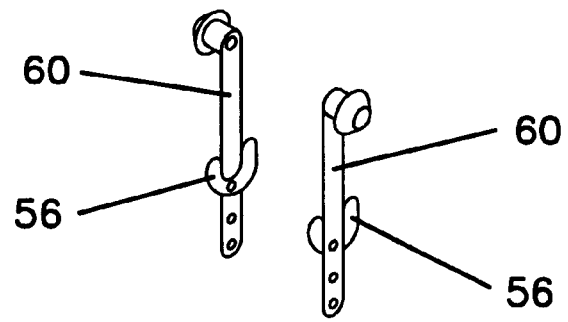
FIG. 16 is a perspective view of a further support system for a personal computer housing.

It also is possible to provide the advantages of the double pivot system to a personal computer housing in which the pivot pin 52 is secured directly to the housing. This is seen in FIG. 16. In this case, the arms 60 are provided with bearing surfaces 56, which will support the pivot pins mounted on the computer housing. Provision can be made for adjustment of the position of the bearing surfaces, for example by providing several apertures on the arms 60 for accepting a fastener such as a screw or the like. The arms 60 have their own pivot points, so that the arms can be pivotably supported by a support structure, for example that of FIG. 15.

It also would be possible to provide a support structure that supports the personal computer housing from only one side. For example, such a support could be in the form of an L-shaped plate in which one leg of the L rests on the edge of a work surface and the other leg extends down the side of the work surface. A bearing surface would be associated with the second leg, for engaging a pivot pin of the personal computer housing. For this application, a pivot pin having an enlarged head would be useful.

Friction between the second leg of the L and the personal computer housing could be reduced by disposing a ball bearing plate between the two. For example, a support member such as that illustrated in FIG. 10 could be configured to include the bearing plate. Conceptually the facing surfaces of the support member and the second leg of the L-shaped support member will form a "lazy susan" type of construction, in which the ball bearing plate accepts the load of the personal computer in the direction of the second leg of the L.

Figure 17:
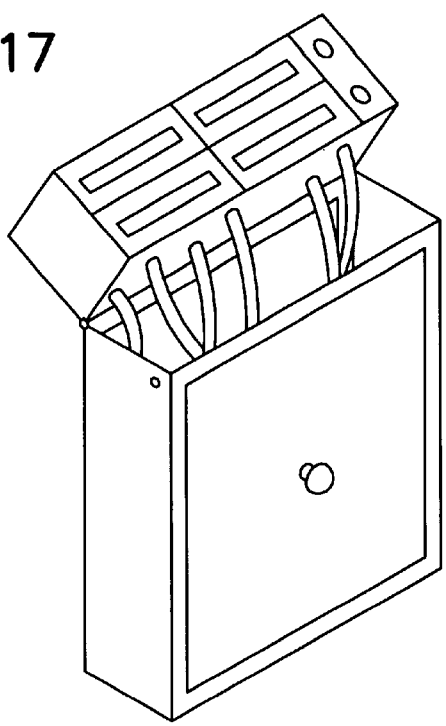
FIGS. 17 and 18 are perspective views of a further aspect of the present invention in which improved access to components in the personal computer housing is provided.
Figure 18:
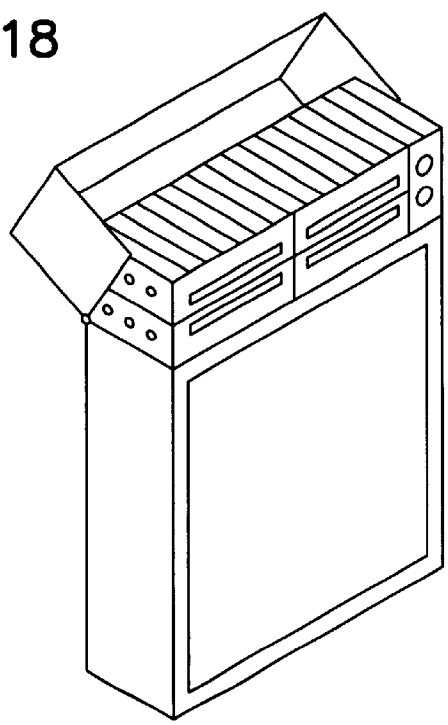

A further aspect of the present invention is illustrated in FIGS. 17 and 18. That is, with the Configuration illustrated in FIGS. 1–3, it can be difficult to access the wiring when repairing or replacing the disc drives, etc. This is particularly true when there are two or more such devices arranged vertically, in which case the lower device can impede the handling of the upper device. The embodiments of FIGS. 17 and 18 solves this problem by permitting the upper portion of the personal computer housing to pivot, thereby facilitating access to the wiring and input/output devices for servicing, removal and installation.

In the embodiment of FIG. 17, the top cover portion of the housing is pivotably mounted with respect to the remainder of the housing and is capable of flipping up to expose the disk drives, etc. In the embodiment of FIG. 18, the frame on which the disk drives, etc. are carried is pivotably mounted at the back of the housing. Thus, the frame can be flipped up to expose the wiring, connections to the motherboard ??, etc. It should be noted that the features of FIGS. 17 and 18 can be combined in a single structure. That is, the top cover portion of the housing and the frame on which the disk drives, etc. are mounted can be independently pivotable. It also should be noted that the embodiments of FIGS. 17 and 18 can be modified to include an appropriate connecting system to secure the top cover portion and/or the frame on which the disk drives, etc. against unwanted movement. This could be as simple as a locking pin or clip, although more elaborate structures could be used as well.

Although a detailed description of the present invention has been provided above, the present invention is not limited to the specific embodiments described herein, but rather is defined by the claims which will follow.

What is claimed is:

1. A work station, comprising:
   a work surface;
   a support structure associated with the work surface, defining an opening sufficiently large to accept a personal computer;

wherein the support structure supports a personal computer at a position in which a first portion of the personal computer is disposed above the level of the work surface and a second portion of the personal computer is disposed below the level of the work surface.

2. The work station of claim 1, wherein the support structure defines an opening of sufficient size to permit pivoting of a personal computer supported in the opening about an axis parallel to the work surface.

3. The work station of claim 2, wherein the support structure comprises a pivot point disposed substantially at the level of the work surface, said pivot point being adapted to cooperate with a pivot member on a personal computer to permit the personal computer to be pivoted out of the opening.

4. The work station of claim 2, wherein the support structure comprises a pivot point disposed beneath the level of the work surface, said pivot point being adapted to cooperate with a pivot member on a personal computer to permit the personal computer to be pivoted within the opening.

5. The work station of claim 3, wherein the support structure comprises a second pivot point disposed beneath the level of the work surface, said second pivot point being adapted to cooperate with a second pivot member on a personal computer to permit the personal computer to be pivoted within the opening.

6. The work station of claim 3, wherein the support structure comprises a movable flap member capable of moving between a first position where the flap member does not impede pivoting movement of a personal computer out of the opening and a second position in which the flap member can support a personal computer that has been pivoted out of the opening.

7. A work station, comprising:
   a work surface;
   a support structure associated with the work surface, defining an opening sufficiently large to accept a personal computer;
   a personal computer supported by said support structure, comprising:
      a housing which comprises:
         a top;
         a bottom;
         two opposed major faces extending between the top and the bottom; and
         two opposed side faces extending between the top and the bottom and between the two opposed major faces; and
      at least one input/output device disposed adjacent the top of one of the faces of the housing,
   wherein the support structure supports the personal computer at a position in which a first portion of the personal computer comprising the input/output device is disposed above the level of the work surface and a second portion of the personal computer is disposed below the level of the work surface.

8. The work station of claim 7, wherein the support structure supports the personal computer at a level such that only the area of the housing in which the input/output device is disposed is positioned above the level of the work surface.

9. The work station of claim 7, wherein the support structure comprises a pivot point disposed beneath the level of the work surface, and said personal computer housing comprises a first pivot member cooperating with said pivot point, said first pivot member being pivotably secured to the personal computer housing to permit the personal computer to be pivoted within the opening.

10. The work station of claim 9, wherein the first pivot member is mounted on an arm that is pivotably secured to the personal computer housing.

11. The work station of claim 10, wherein the position on the arm that is secured to the personal computer housing is variable.

* * * * *